United States Patent
Floreani et al.

(10) Patent No.: US 8,655,512 B2
(45) Date of Patent: Feb. 18, 2014

(54) METHOD FOR OPERATING A NUMBER OF CONTROL UNITS

(75) Inventors: Bruno Floreani, Stuttgart (DE); Andre Owerfeldt, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/395,798

(22) PCT Filed: Sep. 14, 2010

(86) PCT No.: PCT/EP2010/063429
§ 371 (c)(1),
(2), (4) Date: Jun. 15, 2012

(87) PCT Pub. No.: WO2011/032926
PCT Pub. Date: Mar. 24, 2011

(65) Prior Publication Data
US 2012/0245755 A1  Sep. 27, 2012

(30) Foreign Application Priority Data
Sep. 17, 2009 (DE) .......... 10 2009 029 541

(51) Int. Cl.
*G01C 5/00* (2006.01)
(52) U.S. Cl.
USPC ............................................................ 701/9

(58) Field of Classification Search
None
See application file for complete search history.

(56) References Cited

U.S. PATENT DOCUMENTS 6,128,658 A   10/2000   McLean

FOREIGN PATENT DOCUMENTS

| DE | 101 33 802 | 12/2002 |
| DE | 101 61 834 | 6/2003 |
| DE | 10 2004 007 721 | 8/2004 |
| DE | 10 2004 060 007 | 6/2006 |
| DE | 601 26 373 | 11/2007 |
| FR | 2 917 555 | 12/2008 |

OTHER PUBLICATIONS

International Search Report for PCT/EP2010/063429, dated Nov. 18, 2010.

*Primary Examiner* — Thomas Tarcza
*Assistant Examiner* — Adam Alharbi
(74) *Attorney, Agent, or Firm* — Kenyon & Kenyon LLP

(57) ABSTRACT

In a method for operating a number of control units including a central control unit which has a central wakeup functionality units, at least one control unit requests a wakeup signal for at least one future instant from the central control unit, and the at least one control unit is informed and awakened by the central control unit when the at least one instant is at hand.

7 Claims, 1 Drawing Sheet

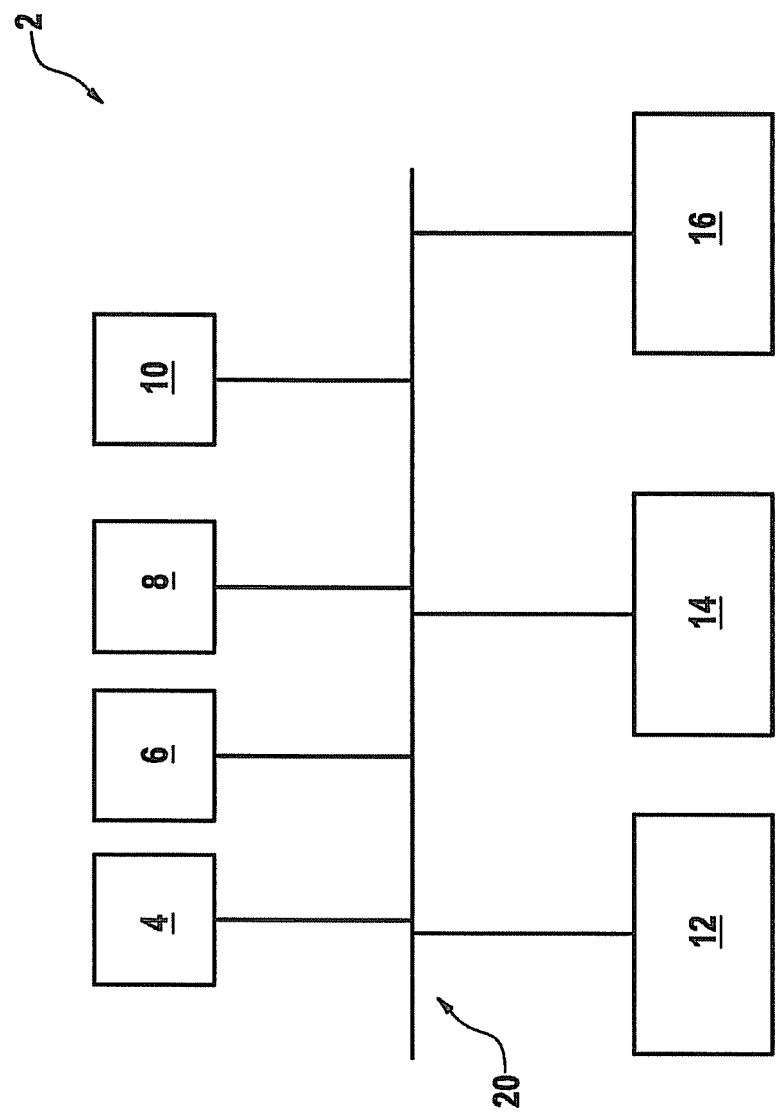

METHOD FOR OPERATING A NUMBER OF CONTROL UNITS

BACKGROUND OF THE INVENTION

1. Field of the Invention

The present invention relates to a method for operating a number of control units, and also relates to a central control unit and a system having a number of control units.

2. Description of Related Art

Various monitoring functions, which are cyclically executed even in the quiescent state of the vehicle, are implemented in control units of motor vehicles. Cycle times for implementing the functions are defined by a system function, such as by the so-called heartbeat for monitoring a control line between a theft alarm system and a siren, for example, or else by the cyclical monitoring of a battery state with the aid of an electronic battery sensor. For this purpose a control unit of a vehicle automatically switches between a function mode having increased current consumption and a quiescent mode during which a quiescent current is withdrawn.

A combination of a special hardware infrastructure and possible operating modes or modes of microcontrollers (μC) such as the so-called subclock mode, are generally used for leaving the quiescent current mode at a defined point in time. The physical bus connection by so-called transceivers, or transmit and receive units, for the currently used procedures includes the step of initiating the wakeup of connected hardware modules and microcontrollers. Furthermore, it is necessary to minimize the current consumption in the quiescent mode so that a start of a vehicle is ensured even after longer periods of inactivity.

The German patent application publication DE 601 26 373 T2 describes a vehicle network which encompasses one or more electronic control unit(s), which is/are able to be operated at low power both in an active state and in a quiescent state, and which can switch from the quiescent state to the active state after receiving a wakeup call, which is transmitted by a control unit provided for this purpose. In the process, said control unit also generates a first message after providing the wakeup signal.

A control system for a motor vehicle is known from the German patent application publication DE 10 2004 007 721 A9. The control system includes a first device which is set up to execute at least one control function in the motor vehicle, and it includes at least one control unit which, if required, may be coupled to a drive, an actuator, a sensor or the like and is suitable for executing a function such as unlocking and/or locking the car doors, the ignition start circuit, a steering wheel lock, vehicle immobilizer and a seat control for adjusting the seat position. The first device and the control device are disposed together for the transmission of signals in a vehicle electrical system made up of at least one bus system, in particular. In addition, a control device which operates in the manner of a central quiescent manager is provided, this control device actuating the control unit, so that the control unit is able to be activated for executing its function.

BRIEF SUMMARY OF THE INVENTION

Among other things, the present invention allows for the use of a central control unit among control units networked together, as central and programmable wakeup instance for the other control units. The function of cyclical waking of control units is thus able to be implemented in a cost-effective and flexible manner. For example, reductions in the quiescent current in a vehicle come about because the control units utilizing the service for providing the wakeup signal are able to be operated in a mode that uses a low quiescent current. Further cost savings are possible because the hardware infrastructure required in the control units in order to implement the automatic waking from the quiescent state is dispensed with since it is implemented only once in the central wakeup instance or the central control unit. The flexibility in the further development of functions in an existing vehicle topology is able to be increased as well. The control units requesting the service may be developed without limitations with regard to minimum or maximum wakeup times.

Within the framework of the method, control units to be awakened request wakeup signals, which are then transmitted from the central control unit once a specified instant has occurred. The communication provided for this purpose takes place via the communication bus and is accompanied by a change of state or status on the communication bus in the quiescent current pickup of the individual control units.

In contrast to the current procedure, one development of the method according to the present invention provides no predefined wakeup function. In one specific embodiment of the method, the different control units may report to the central control unit implemented as wakeup instance and make known and/or request their wakeup wish, typically in conjunction with at least one future instant for the waking. This wakeup wish may be triggered and/or initiated temporally, an exact instant being providable for the wakeup, e.g., xx.yy o'clock, or a time interval of zz minutes, for example, after which the wakeup is to take place. As an alternative or in addition, the wakeup wish may also depend on a defined event. A combination of both is possible as well. This leads to high flexibility with regard to the quiescent current management and may reduce the energy consumption for different control units that had to be awakened cyclically or synchronized until now.

In the case of door control devices, for example, it is provided that these devices have an LED lamp blink during a time interval of, for instance, 28 days in the quiescent state and must then switch themselves off. In one development of the present invention, the central control unit to which the time of the vehicle is available, is able to inform the door control device after these 28 days, usually following a specified time interval, that the 28-day time interval has elapsed. The commonly implemented function for counting down the time interval is therefore dispensed with in the door control unit.

The system described is designed to execute all of the steps of the introduced method. The individual steps of this method are also implementable by individual components of the system, such as the described central control unit. Furthermore, functions of the system, or functions of individual components of the system, may be implemented as steps of the method. In addition, it is possible that steps of the method are implemented as functions of individual components of the system or of the entire system.

BRIEF DESCRIPTION OF THE DRAWINGS

FIG. 1 shows a specific embodiment of a system according to the present invention in a schematic representation.

DETAILED DESCRIPTION OF THE INVENTION

The specific embodiment of a system 2 according to the present invention and schematically illustrated in FIG. 1 includes a number of control units 4, 6, 8, 10, 12, 14, 16 for a technical device, which are interconnected via a network or communication bus 20 for the exchange of signals. In this case it is provided that a so-called central control unit 10 is implemented as wakeup instance for the other control units 4, 6, 8, 12, 14, 16. This may mean that an additional function for executing steps of one specific embodiment of the method according to the present invention is implemented in central control unit 10.

For this purpose, central control unit 10 in the network connection provides the service of a programmable wakeup instance to the other connected control units 4, 6, 8, 12, 14, 16. Toward this end, connected control units 4, 6, 8, 12, 14, 16 apply for wakeup signals according to freely selectable times. The time may be a delta time, i.e., a time span that is restricted by at least one instant, which usually is a start and an end instant, or it may be an absolute time defined by an instant. To execute the method, central control unit 10 includes a real time clock or it is at least connected to a real time clock.

After the time has elapsed, central control unit 10 wakes at least one other control unit 4, 6, 8, 12, 14, 16 via communication bus 20 or possibly also via separate communication interfaces or lines.

In order to further minimize the current consumption of all connected control units 4, 6, 8, 12, 14, 16 after the wakeup via communication bus 20, a bus communication optimized for the wakeup phases, comparable to the so-called network management, must be implemented in order to keep the time during which control units 4, 6, 8, 12, 14, 16 are in the function mode as low as possible in this manner.

What is claimed is:

1. A method for operating a plurality of control units including a central control unit and secondary control units, the method comprising:
   providing the central control unit with a central wakeup functionality for the secondary control units;
   at least one secondary control unit requesting a wakeup signal for at least one instant in the future from the central control unit; and
   awakening the at least one secondary control unit by the central control unit when the at least one instant is reached, wherein the control units control functions within a vehicle and are interconnected via an intra-vehicle network.

2. The method as recited in claim 1, wherein the at least one secondary control unit is initially in a function mode, and wherein the at least one secondary control unit transmits to the central control unit a request for the provision of the wakeup signal at the at least one instant, prior to a switchover of the at least one secondary control unit from the function mode to a quiescent mode.

3. The method as recited in claim 2, wherein the at least one instant is defined by a time interval, and wherein the at least one secondary control device is awakened by the central control unit at the end of the time interval.

4. The method as recited in claim 2, wherein the wakeup signal is transmitted when a predefined condition is satisfied, the at least one instant for transmitting the wakeup signal being reached as soon as the predefined condition is satisfied.

5. A system of control units, comprising:
   a plurality of secondary control units; and
   a central control unit having a central wakeup functionality for the plurality of secondary control units;
   wherein at least one secondary control unit requests a wakeup signal for at least one instant in the future from the central control unit, and wherein the central control unit wakes up the at least one secondary control unit when the at least one instant is reached; and
   wherein the control units control functions within vehicle and are interconnected via an intra-vehicle network.

6. The system as recited in claim 5, wherein the central control unit is configured as a control unit for a technical device.

7. The system as recited in claim 5, wherein the central control unit and the secondary control units are interconnected via a communication bus.

* * * * *